(12) United States Patent
Quere et al.

(10) Patent No.: US 10,131,102 B2
(45) Date of Patent: Nov. 20, 2018

(54) PROCESS AND SYSTEM FOR MANUFACTURING AN OPHTHALMIC LENS

(71) Applicant: ESSILOR INTERNATIONAL (COMPAGNIE GENERALE D'OPTIQUE), Charenton-le-Pont (FR)

(72) Inventors: Loic Quere, Charenton-le-Pont (FR); Alexandre Gourraud, Charenton-le-Pont (FR); Pascal Allione, Charenton-le-Pont (FR); Cedric Begon, Charenton-le-Pont (FR); Gilles Le Saux, Charenton-le-Pont (FR)

(73) Assignee: ESSILOR INTERNATIONAL, Charenton-le-Pont (FR)

( * ) Notice: Subject to any disclaimer, the term of this patent is extended or adjusted under 35 U.S.C. 154(b) by 334 days.

(21) Appl. No.: 14/895,830

(22) PCT Filed: Jun. 6, 2014

(86) PCT No.: PCT/FR2014/051363
§ 371 (c)(1),
(2) Date: Dec. 3, 2015

(87) PCT Pub. No.: WO2014/195654
PCT Pub. Date: Dec. 11, 2014

(65) Prior Publication Data
US 2016/0114542 A1 Apr. 28, 2016

(30) Foreign Application Priority Data
Jun. 7, 2013 (FR) ...................................... 13 55301

(51) Int. Cl.
*B29D 11/00* (2006.01)
*B33Y 10/00* (2015.01)
(Continued)

(52) U.S. Cl.
CPC ...... *B29D 11/00009* (2013.01); *B29C 64/106* (2017.08); *B29D 11/00432* (2013.01);
(Continued)

(58) Field of Classification Search
CPC .......... B29D 11/00932; B29D 11/0098; B29D 11/00961; B29D 11/00009; B29C 64/106; B29C 67/0088; B33Y 10/00; G02C 7/028
See application file for complete search history.

(56) References Cited

U.S. PATENT DOCUMENTS

| 2002/0147521 A1 | 10/2002 | Mok et al. | |
| 2004/0046287 A1* | 3/2004 | Andino | C08G 18/6212 264/401 |

(Continued)

FOREIGN PATENT DOCUMENTS

| EP | 1 896 878 | 3/2008 |
| JP | 2002-182011 A | 6/2002 |

(Continued)

OTHER PUBLICATIONS

International Search Report, dated Sep. 17, 2014, from corresponding PCT application.

*Primary Examiner* — Mathieu D Vargot
(74) *Attorney, Agent, or Firm* — Young & Thompson

(57) ABSTRACT

A process for manufacturing an ophthalmic lens having at least one optical function, includes the following steps: additively manufacturing (100) an intermediate optical element by depositing a plurality of preset volume elements of at least one material having a preset refractive index, the intermediate optical element including a target ophthalmic lens and a thickness allowance consisting of a portion of the plurality of volume elements; and subtractively manufacturing (300), by machining, the target ophthalmic lens from the intermediate optical element, the machining being carried out in a preset sequence, of at least one step, the preset (Continued)

sequence making it possible to subtract the thickness allowance, the additive manufacturing step (100) including a step of determining a manufacturing setpoint for the intermediate optical element in which the thickness allowance is determined depending on the preset sequence defined in the subtractive manufacturing step (300).

20 Claims, 3 Drawing Sheets

(51) Int. Cl.
  *B29C 64/106* (2017.01)
  *B29K 33/04* (2006.01)
(52) U.S. Cl.
  CPC ......... *B33Y 10/00* (2014.12); *B29D 11/00932* (2013.01); *B29D 11/00961* (2013.01); *B29K 2033/04* (2013.01)

(56) References Cited

U.S. PATENT DOCUMENTS

| | | |
|---|---|---|
| 2005/0104240 A1 | 5/2005 | Jethmalani et al. |
| 2008/0125013 A1* | 5/2008 | Schaeffer ............... B24B 9/148 451/5 |
| 2009/0161071 A1 | 6/2009 | Dreher et al. |
| 2009/0225435 A1 | 9/2009 | Boettiger et al. |
| 2010/0136290 A1 | 6/2010 | Biver et al. |

FOREIGN PATENT DOCUMENTS

| | | |
|---|---|---|
| WO | 2006/136757 A2 | 12/2006 |
| WO | WO 2015/014380 * | 2/2015 |

\* cited by examiner

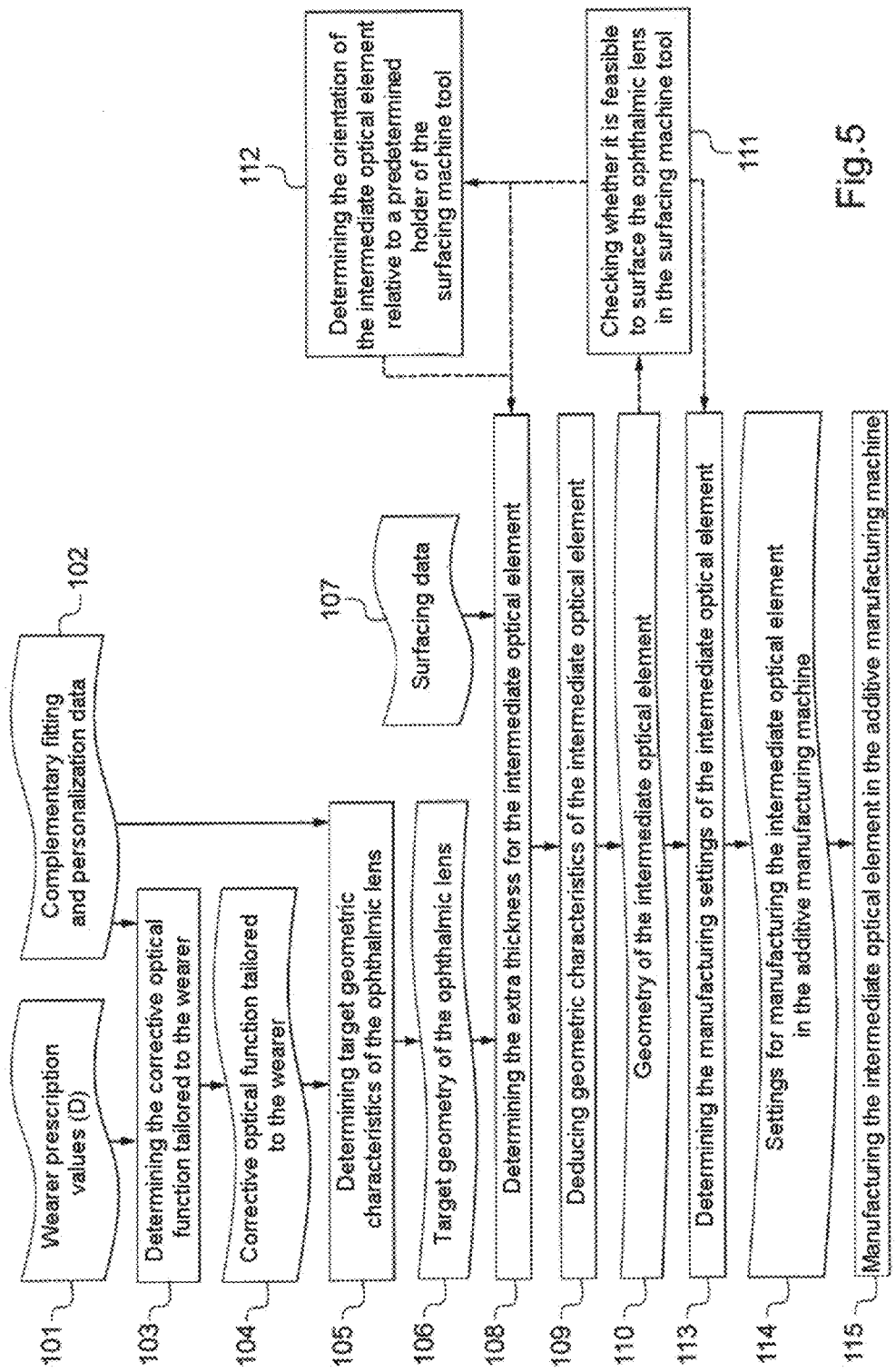

PROCESS AND SYSTEM FOR MANUFACTURING AN OPHTHALMIC LENS

FIELD OF THE INVENTION

The invention relates to the field of the manufacture of ophthalmic lenses having at least one optical function, for example progressive ophthalmic lenses.

The invention more particularly relates to a process for manufacturing such ophthalmic lenses.

The invention also relates to a manufacturing system configured to manufacture such an ophthalmic lens.

TECHNOLOGICAL BACKGROUND

It is known that ophthalmic lenses are subjected to various manufacturing steps in order to give them the prescribed ophthalmic properties.

Processes for manufacturing ophthalmic lenses are known that comprise a step of providing an unprocessed or semi-finished lens blank, i.e. a lens blank none of the faces or only one of the faces of which is what is referred to as finished (or in other words a face that defines a simple or complex optical surface).

These processes then comprise one or more steps of machining at least one face of the unprocessed lens blank, in order to obtain what is referred to as a finished face, defining the sought-after optical surface providing the (possibly complex) optical properties prescribed to the wearer of the ophthalmic lens.

The expression "one or more steps of machining" is here understood to mean steps of what are referred to as roughing, finishing and polishing (machining by surfacing).

The roughing step makes it possible, starting from an unprocessed or semi-finished lens blank, to give the face(s) of the lens blank which are referred to as unfinished its (their) thickness and surface radii of curvature, whereas the finishing (also called smoothing) step consists in fining the grain or even the precision of the radii of curvature of the faces obtained beforehand and allows the curved surface(s) generated to be prepared (smoothed) for the polishing step. This polishing step is a step of surfacing the roughed or smoothed curved surface(s), and makes it possible to make the ophthalmic lens transparent. The roughing and finishing steps are the steps that set the thickness of the final lens and the radii of curvature of the treated surface, independently of the thickness of the initial object and of its initial radii of curvature.

It will be noted that one type of complex optical surface, referred to as a "free-form surface" or "digital surface", requires particularly precise machining, such a surface for example combining a torus and a progression. The machining of such a complex optical surface is carried out using at least one very high-precision machine tool at least for the roughing step, or even for the finishing and polishing step, and a polisher capable of polishing the surface(s) obtained in the preceding steps without deforming the ophthalmic lens.

SUBJECT OF THE INVENTION

The invention aims to provide a process for manufacturing an ophthalmic lens having at least one optical function, which is particularly simple, easy and economical to implement, and that is also capable of delivering rapidly and flexibly lenses having very diverse geometries and material properties, meeting a mass-market personalization requirement.

Thus, the subject of the invention, according to a first aspect, is a process for manufacturing an ophthalmological lens having at least one optical function, characterized in that it includes the following steps:

additively manufacturing an intermediate optical element by depositing a plurality of predetermined volume elements of at least one material having a predetermined refractive index, said intermediate optical element comprising a target ophthalmic lens adjoined to an extra thickness (Se) consisting of a portion of said plurality of volume elements; and subtractively manufacturing by machining said target ophthalmic lens from said intermediate optical element, the machining being carried out in a predetermined sequence, of at least one step, said predetermined sequence allowing said extra thickness to be subtracted, said additive manufacturing step comprising a step of determining manufacturing settings for said intermediate optical element in which said extra thickness is determined depending on said predetermined sequence defined in the subtractive manufacturing step.

The manufacturing process according to the invention is based on a combination of two manufacturing steps, namely an additive manufacturing step and a subtractive manufacturing step, and on implementing the additive manufacturing step depending on the predetermined sequence of the at least one subtractive manufacturing step, said sequence being taken into account when determining the manufacturing settings of the additive manufacturing step.

Additive manufacturing techniques are a particularly appropriate way of meeting the objective of the invention.

The expression "additive manufacturing" is understood to mean, according to international standard ASTM 2792-12, manufacturing techniques comprising a process involving fusing materials in order to manufacture objects from 3-D modeling data (typically a computer-assisted design (CAD) file), usually layer by layer, as opposed to subtractive manufacturing methodologies, such as traditional machining.

Additive manufacturing technologies consist in manufacturing objects by juxtaposing solid material elements in accordance with a predetermined arrangement contained in digital form in a CAD file.

These elementary volume elements, denoted "voxels", may be created and juxtaposed using a variety of different technical principles, for example by providing drops of photopolymerizable monomers by means of a print head, by selectively photopolymerizing with a source of UV light near the surface of a bath of monomer (stereolithography technique), or by melting polymer powder (selective laser melting (SLM) or selective laser sintering (SLS)).

Additive manufacturing techniques allow the geometry of objects to be defined with a great deal of flexibility, but raises a number of problems if one desires to manufacture transparent ophthalmic lenses that do not scatter light and that provide an optical prescription by way of a very precise diopter geometry on each face of the lens, these diopters can be spherical, or pseudo-spherical or sphero-toric or pseudo-sphero-toric.

The following problems are specially encountered:
voxel-by-voxel construction does not tend itself to obtaining the smooth surfaces that are required for optical applications; and
additive construction techniques make it difficult to control the dimensional characteristics of the product element with the precision required for an optical application; in particular it is difficult to achieve with an excellent precision local control of the radius of curvature of the lens.

It will be seen that the invention takes account of these problems inherent to additive manufacturing in order to make it compatible with the manufacture of an ophthalmic lens.

It will be noted that the additive manufacturing step allows an intermediate optical element to be obtained having a desired volume uniformity and providing at least part of the optical function tailored to the wearer; and that the subtractive manufacturing step, which is carried out after the additive manufacturing step, allows the desired optical function to be finalized and to obtain, from the intermediate optical element, an ophthalmic lens having a surface roughness quality, that can be characterized by roughness parameters.

The additive manufacturing step thus makes it possible to provide an intermediate optical element comprising the target ophthalmic lens and comprising, over all or some of its future external surface, an extra thickness, the extra thickness being defined by taking into account optimized material removing capacities of the means used for carrying out the subtractive manufacturing step.

Thus, as the step of determining the manufacturing settings of the intermediate optical element is based on the aforementioned predetermined sequence, this step makes it possible to take into consideration the material removing capacity (in other words the thickness that is removable from the intermediate optical element) of a manufacturing system comprising one or more subtractive manufacturing machines, it being understood that this capacity is comprised in the predetermined value range [1 µm; 2000 µm].

The extra thickness may vary as a function of position relative to the surface of the final ophthalmic lens.

The extra thickness preferably has an average value lower than or equal to 1000 µm, so as to be machinable by means of a finishing or polishing step, without roughing. More preferably, the extra thickness is on average comprised in the predetermined value range [30 µm and 500 µm].

The combination of these two manufacturing steps forms what is referred to as a hybrid process that advantageously allows an ophthalmic lens having both the correct optical function, perfectly adjusted to the needs of the wearer, and a surface roughness quality compatible with ophthalmic applications, to be obtained.

The expression "correct optical function" is understood to mean an optical function having, within a margin of error which may reach +/−0.12 diopters at certain points of the ophthalmic lens, the prescription provided by the wearer.

By surface quality compatible with ophthalmic applications, what is meant is a surface quality that makes it possible to guarantee that the degree of transmission of the ophthalmic lens, in the visible spectrum (380/700 nm), will be higher than 85%, and its diffusion ratio lower than 1%.

The manufacturing process according to the invention is particularly simple, easy and economical, above all in the context of production of a wide diversity of optical functions (because of the personalization of these optical functions), requiring manufacturing processes that are rapid and flexible.

It will be noted that the additive manufacturing for example corresponds to a three-dimensional printing process, for example implementing polymer inkjet printing, or stereolithography, or mask projection stereolithography, or selective laser sintering (SLS) or selective laser melting (SLM) or even thermoplastic filament extrusion, whereas the subtractive manufacturing corresponds to a machining process, the latter comprising at least one step chosen from a roughing step, a finishing step and a polishing step.

It will also be noted that in the context of the invention, the following expressions have the following meanings:

"roughing step", the step consisting in machining the intermediate optical element, by means for example of a cutter or a diamond tool, in order to give it the thickness and radii of curvature of the target ophthalmic lens or a thickness and radii of curvature close to those of the target ophthalmic lens;

"finishing step", the step consisting in fining the grain and/or fining the radii of curvature, for example by means of a diamond tool or a tool having an abrasive surface, of the surface of the intermediate optical element, in order to get it ready to undergo a polishing step; and "polishing step", the step consisting in giving the intermediate optical element the transparency required for the target ophthalmic lens; this step allows traces left by the roughing and finishing to be removed; it is especially carried out by means of a polisher that is softer and an abrasive slurry that is of finer grain than those implementable in a finishing step; this step is also called a "soft polish"; in particular, the curvature of the main spherical or toric (or pseudo-spherical or pseudo-toric) correction, referred to as the base correction, or the curvature of an addition, possibly provided in what is referred to as the "near-vision" zone, are not notably impacted by the soft polishing step.

The roughing and finishing steps are therefore the steps in which the shape and curvatures of the treated surface are set, independently of the shape and curvatures of the initial surface. It will be noted that another possible machining step is a "hard polishing" step, especially using a spherical or toric hard polisher, and an abrasive slurry of finer grain than that of the abrasive solutions used in the preceding steps, which by rotation and abrasion of the surface to be treated gives the latter a spherical or toric curvature complementary to that of the hard polisher. In the context of the invention, such a "hard polishing" is one variant of the finishing step.

It will also be noted that the expression "optical function", when applied to a lens or an intermediate optical element, is understood to mean the optical response of this lens or this element, i.e. a function defining any modification of the propagation and transmission of an optical beam through the lens or optical element in question, whatever the incidence of the entering optical beam and whatever the geometric extent of the entrance diopter illuminated by the incident optical beam.

More precisely, in the ophthalmic field, optical function is defined as the distribution of wearer-power and astigmatism characteristics and of prismatic deviations and higher-order aberrations associated with the lens or optical element for all the directions of the gaze of a wearer of this lens or this element. Of course, this assumes that the geometric position of the lens or optical element relative to the eye of the wearer is already known.

According to preferred, simple, practical and economical features of the method according to the invention:

the extra thickness generated in the additive manufacturing step leading to the intermediate optical element and then subtracted in the subtractive manufacturing step leading to the target ophthalmic lens is comprised between 1 µm and 1000 µm inclusive and preferably comprised between 30 µm and 1000 µm inclusive;

said predetermined sequence comprises at least one step chosen from a roughing step, a finishing step and a polishing step, alone or in combination;
said predetermined sequence is chosen from:
  a roughing step carried out on the intermediate optical element leading to an intermediate optical element of state 2, followed by a finishing step carried out on said intermediate optical element of state 2 leading to an intermediate optical element of state 3, followed by a polishing step carried out on said intermediate optical element of state 3 leading to the target ophthalmic lens; or
  a finishing step carried out on the intermediate optical element leading to an intermediate optical element of state 4, followed by a polishing step carried out on said intermediate optical element of state 4 leading to the target ophthalmic lens; or
  a polishing step carried out on the intermediate optical element leading to the target ophthalmic lens;
said predetermined sequence is identical or different on the whole of the intermediate optical element;
the step of additively manufacturing an intermediate optical element comprising the target ophthalmic lens adjoined to an extra thickness (Se) is carried out by depositing a plurality of predetermined volume elements of a given constituent material of the target ophthalmic lens and extra thickness;
the step of additively manufacturing an intermediate optical element comprising the target ophthalmic lens adjoined to an extra thickness (Se) is carried out by depositing a plurality of predetermined volume elements of at least two different materials, the materials especially differing in their refractive index or in their intrinsic abradability;
the additive manufacturing step implements a three-dimensional printing, or stereolithography, or mask projection stereolithography process or a selective laser melting or sintering process, or a thermoplastic filament extrusion process;
said step of determining manufacturing settings for said intermediate optical element includes the following steps:
  determining target geometric characteristics for said ophthalmic lens from characteristics of said optical function to be given to said ophthalmic lens;
  determining said extra thickness, from said determined target geometric characteristics and characteristics associated with said predetermined subtractive manufacturing sequence; and
deducing the geometric characteristics of said intermediate optical element from said determined target geometric characteristics and from said determined extra thickness;
the step of determining said extra thickness furthermore includes taking into account physical data of material associated with said predetermined subtractive manufacturing sequence;
said optical function to be given to said ophthalmic lens is characteristic of prescription values associated with a wearer of said ophthalmic lens and complementary fitting data of a predetermined frame and/or personalization data and/or frame-shape data;
the intermediate optical element has an outline substantially equal to an outline configured to be inserted into a predetermined frame; and/or
after the subtractive manufacturing step, a varnish coating or film is deposited on the surface of the final lens.

Another subject of the invention, according to a second aspect, is a system for manufacturing an ophthalmic lens, including an additive manufacturing machine and at least one subtractive manufacturing machine, in order to manufacture an ophthalmic lens, and at least one command/control unit provided with system elements configured to run a computer program comprising instructions configured to implement each of the steps of the process described above.

Advantageously in the manufacturing system according to the invention:
  provision is furthermore made for a varnishing machine configured to deposit a varnish on the element output by the subtractive manufacturing machine; and/or
  the additive manufacturing machine comprises a manufacturing holder, which manufacturing holder is removable and configured to serve as a manufacturing holder for the subtractive manufacturing machine.

It will be noted that according to one variant of the invention, the additive then subtractive manufacturing steps may be followed by deposition of a varnish film chosen in order to mitigate surface irregularities. In particular, reference is here being made to varnish layers of the kind described in patent application EP1896878 of the Applicant, or JP 2002-182011, which are configured to allow a surface having a certain initial quality to reach an ophthalmic quality, quality obtained by soft polishing, the application of this varnish layer not modifying the principal curvatures of the surface of the lens, such as the principal curvature or a set of features defining the addition(s).

BRIEF DESCRIPTION OF THE DRAWINGS

The subject matter of the invention will now be explained by way of a description of one embodiment thereof, given, by way of nonlimiting illustration, below with reference to the appended drawings, in which:

FIGS. 5 and 6 are flowcharts showing the step of additively manufacturing the intermediate optical element and the step of manufacturing by surfacing the ophthalmic lens, respectively.

DETAILED DESCRIPTION OF AN EXAMPLE EMBODIMENT

Figure 1:
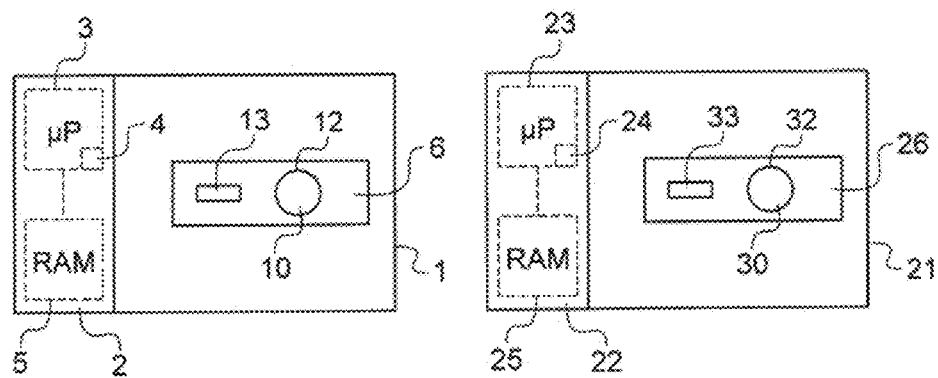
FIG. 1 schematically shows a manufacturing system comprising an additive manufacturing machine and a turning machine tool, these machines being configured to produce an ophthalmic lens.

FIG. 1 illustrates a system for manufacturing an ophthalmic lens, including an additive manufacturing machine 1, here a digitally controlled three-dimensional printing machine, and a subtractive manufacturing machine 21, for example of the "free-form" or "digital surfacing" type, here a turning machine tool (or surfacing machine) that is also digitally controlled.

The expression "digitally controlled" designates that the additive manufacturing and surfacing machines 1, 21 include suites of hardware and software especially having the function of giving motional instructions to all the respective units of these machines.

The additive manufacturing machine 1 is here configured to deposit juxtaposed a plurality of predetermined volume elements forming superposed layers (layer-by-layer deposition in other words) of at least one material on a manufacturing holder 12 so as to form an intermediate optical element 10.

This intermediate optical element 10 is configured to form a target ophthalmic lens 30.

Each predetermined volume element is defined by a predetermined composition and a predetermined size.

As it is here a question of additive manufacturing and in particular of three-dimensional printing, volumetric elements or volume elements, also referred to as voxels (three-dimensional pixels), are also spoken of.

This intermediate optical element 10 is therefore borne by the manufacturing holder 12.

It will be noted that the manufacturing holder 12 is a predetermined holder of the additive manufacturing machine 1 and therefore its geometric characteristics are known and contained in a file that is stored in or loaded into a first command/control unit 2 of the additive manufacturing machine 1.

The manufacturing holder 12 of the additive manufacturing machine 1 comprises a body provided with a manufacturing surface that has an overall geometry all or some of which is independent or dependent on the geometry of at least one surface of the object to be produced by additive manufacturing.

The manufacturing holder 12 may be removable and even usable in the subtractive manufacturing machine used in addition to the additive manufacturing machine.

The hardware and software of the additive manufacturing machine 1 is furthermore configured to generate motional, handling and control instructions for materials and for polymerization devices that this machine comprises.

The additive manufacturing machine 1 comprises a nozzle or a bank of nozzles 13 in addition to the first command/control unit 2, and the latter is provided with a data processing system comprising a microprocessor 3 equipped with a memory 4, in particular a nonvolatile memory, allowing the microprocessor 3 to load and store a software package, in other words a computer program, that, when it is run in the microprocessor 3, allows an additive manufacturing method to be implemented. This nonvolatile memory 4 is for example a read-only memory (ROM).

The first unit 2 furthermore comprises a memory 5, in particular a volatile memory, allowing data to be stored while the software package is being run and the additive manufacturing method implemented.

This volatile memory 5 is for example a random access memory (RAM) or an electrically erasable programmable read-only memory (EEPROM).

The additive manufacturing machine 1 in addition comprises an aperture 6, here filled with a window, configured to allow access to the intermediate optical element 10 additively manufactured by this machine 1 on the manufacturing holder 12 of the latter.

It will be noted that in order to additively manufacture the intermediate optical element 10, it is necessary to know with precision certain additive manufacturing parameters, such as the speed of advance of the nozzle or nozzles 13 and the type of energy and energy source employed; here a source emitting in the ultraviolet is employed in the three-dimensional printing machine but it could be a laser in the case of a stereolithography machine or else thermal energy could be used, as is the case with tensioned filament deposition, also referred to as thermoplastic filament extrusion.

It is also necessary to know precisely which one or more materials are being used and their states; here these materials take the form of liquid photopolymers or of thermoplastic polymer filaments.

It is also necessary to know with precision the simple or complex optical function(s) prescribed to the ophthalmic lens 30, which optical functions is characterized by a geometry defined in a manufacturing file representative of the simple or complex optical properties of the ophthalmic lens 30. According to a variant, it is also necessary to know personalization parameters of the wearer and/or parameters of the geometry of the frame dedicated to receiving the ophthalmic lens 30, in order to adjust the optical function of the ophthalmic lens to its final use conditions.

Knowing the optical function, and certain personalization and/or frame parameters makes it possible to determine the geometric envelope required for the ophthalmic lens 30 and, thus, to define a minimal three-dimensional external envelope A for the intermediate optical element 10. Specifically the minimal three-dimensional external envelope A must encompass the final ophthalmic lens and an extra thickness Se found on all or some of said final ophthalmic lens.

It will also be reminded that the expression "optical function", when applied to a lens or an optical element, is understood to mean the optical response of this lens or this element, i.e. a function defining any modification of the propagation and transmission of an optical beam through the lens or optical element in question, whatever the incidence of the entering optical beam and whatever the geometric extent of the entrance diopter illuminated by the incident optical beam.

More precisely, in the ophthalmic field, optical function is defined as the distribution of wearer-power and astigmatism characteristics and of prismatic deviations and higher-order aberrations associated with the lens or optical element for all the directions of the gaze of a wearer of this lens or this element. Of course, this assumes that the geometric position of the lens or optical element relative to the eye of the wearer is already known.

It will also be noted that wearer power is just a way of calculating and adjusting the power of the ophthalmic lens, which is different from lensmeter power. Calculation of wearer power ensures that the power perceived by the wearer (i.e. the power of the beam of light that enters into the eye), once the lens has been fitted in the frame and is being worn by the wearer, corresponds to the prescribed power. In general, for a progressive eyeglass, at any point on the eyeglass and especially at its far-vision and near-vision reference points, the power measured with a lensmeter is different from the wearer power. However, the wearer power at the optical center of a unifocal lens is generally close to the power observed with a lensmeter positioned at this point.

The subtractive manufacturing machine 21 is here configured to machine, by applying at least one step chosen from a roughing step, a finishing step and a polishing step, at least the whole or a part of the additively manufactured intermediate optical element 10, in order to form the target ophthalmic lens 30. The intermediate optical element 10 is borne by and held in a predetermined position on a manufacturing holder 32 of the machine 21.

It will be noted that this manufacturing holder 32 is a predetermined holder of the machine 21 and therefore its geometric and locational characteristics are known and contained in a file that is stored in or loaded into a second command/control unit 22 of the subtractive manufacturing machine 21. Said manufacturing holder may advantageously itself be produced by additive manufacturing such as defined according to the invention.

The machine 21 is thus configured to machine all or some of the surface of the intermediate optical element 10, including in the case where the surface of the intermediate optical element is that of a progressive eyeglass, furthermore optionally possessing toric and prismatic components.

The subtractive manufacturing machine 21 includes a spindle 33 bearing a cutting tool (for example a single-crystal diamond tool), referred to as a reciprocating tool (FIG. 7), and the second command/control unit 22, which is similar to the first unit 2 of the additive manufacturing machine 1.

The subtractive manufacturing machine may include, in the same module or in another module, means for carrying out a soft polish in order to polish and smooth asperities and surface roughness present on the surface of the optical element obtained after the machining step.

The subtractive manufacturing machine may also include, in the same module or in another module, means for carrying out a roughing step, such as for example a cutter.

Alternatively, the subtractive manufacturing machine may only include a machine configured to carry out a soft polish if the geometry of the intermediate optical element is such that a soft polish is all that is required to obtain the geometry of the final ophthalmic lens 30.

Alternatively, or in addition to the soft polishing step, a step of depositing a smoothing varnish may be implemented in order to smooth asperities and surface roughness present on the surface of the optical element obtained after the subtractive manufacturing step.

This second unit 22 is thus provided with a data processing system comprising a microprocessor 23 equipped with a memory 24, especially a nonvolatile memory, allowing the microprocessor 23 to load and store a software package, in other words a computer program, that, when it is run in the microprocessor 23, allows a subtractive manufacturing process, and here more particularly a sequence of at least one machining step from a finishing step and a polishing step, to be implemented. This nonvolatile memory 24 is for example a read-only memory (ROM).

All the hardware and software of the additive manufacturing machine 21 is furthermore configured to give motional and handling instructions to all the units that this machine comprises and especially its spindle 33.

The second unit 22 furthermore comprises a memory 25, in particular a volatile memory, allowing data to be stored while the software package is being run and the additive manufacturing method implemented.

This volatile memory 25 is for example a random access memory (RAM) or an electrically erasable programmable read-only memory (EEPROM).

The subtractive manufacturing machine 21 in addition comprises an aperture 26, here filled with a window, configured to allow access to the target ophthalmic lens 30 subtractively manufactured by this machine 21 on the manufacturing holder 32 of the latter.

It will be noted that to subtractively manufacture the target ophthalmic lens 30 from the intermediate optical element 10, it is necessary to know with precision certain roughing, finishing and/or polishing parameters, such as, for example, the speed of rotation of the intermediate optical element, the reciprocating speed of the cutter, number of passes and reciprocating amplitude of the reciprocating tool or the smoothing capacities of the polishing tool, such as its cut-off frequency for example.

Figure 2:
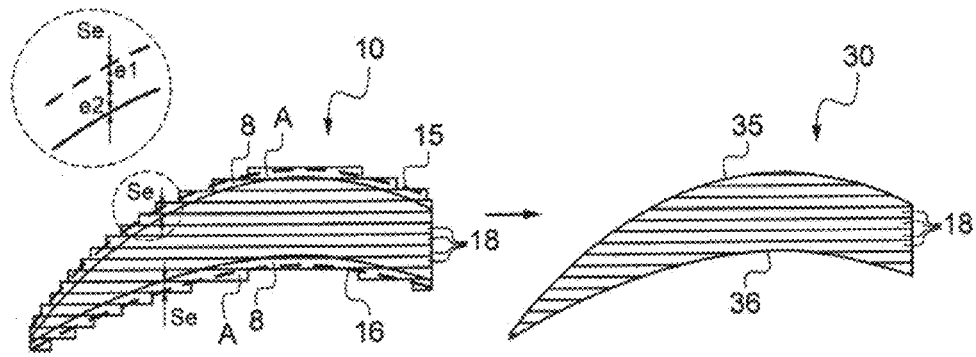
FIGS. 2 and 3 schematically show various steps for manufacturing an ophthalmic lens according to two separate embodiments, respectively, using the system illustrated in FIG. 1.

FIG. 2 schematically shows various steps of a process for manufacturing the target ophthalmic lens 30.

On the left in FIG. 2 is shown the additively manufactured intermediate optical element 10, whereas on the right of this figure is shown the target ophthalmic lens 30 subtractively manufactured from this intermediate optical element 10.

The intermediate optical element 10 has a body provided with a first face 15 that here is convex, and a second face 16 that here is concave. The second face 16, in this embodiment illustrated here, is concave since it is this face that faces the manufacturing surface on which the intermediate optical element 10 is additively manufactured. In the context of the invention, an inverted construction in which the second face 16 is convex may also be produced. Likewise, alternatively the first face 15 may have a concave profile. The mixture of these various alternatives fully forms part of the invention.

This intermediate optical element 10 has a peripheral edge face connecting the first face 15 to the second face 16.

Specifically, the intermediate optical element 10 has here been manufactured directly with an outline matching a shape of a predetermined frame in which the target ophthalmic lens 30 is configured to be fitted.

In other embodiments, the intermediate optical element 10 may have a peripheral edge face forming an outline slightly different to that desired for the target ophthalmic lens 30, for example slightly smaller or slightly larger than an outline configured to be inserted into the predetermined frame, or comprising extensions in order to allow the lens to be handled, or for another reason. In the case where the intermediate optical element 10 has a peripheral edge face with an outline larger than the outline desired for the edge face of the target ophthalmic lens 30, then it will be understood that this complementary outline forms part of the extra thickness Se produced in the additive manufacturing step and that this outline is defined in the step of determining the manufacturing settings. In a yet more particular case, the outline of the intermediate optical element 10 is exactly that desired for the target ophthalmic lens 30.

In one even more particular case, certain at least of the means allowing the target ophthalmic lens to be held in a predetermined frame are produced in the additive manufacturing step. These means may be holes for fastening frames requiring drilled eyeglasses, a groove for receiving a nylon thread for a "nylor" type frame, or a bevel in order to enable complementary housing in a full-rimmed frame.

It is in one of these preferred situations that a subtractive manufacturing step including what is referred to as a roughing step in addition to what is referred to as a finishing or polishing step may most particularly be economically advantageous: the ability to manufacture a target ophthalmic lens 10 that is already the shape recommended for insertion into a predetermined frame may allow, on the one hand, the risk of eyeglass misalignment, which could occur in a subsequent edging step possibly carried out in an optician's shop, to be decreased, and on the other hand, the currently required stocks of semi-finished lens blanks to be decreased.

The intermediate optical element 10 is here formed by a plurality of predetermined volume elements that are juxtaposed and superposed to form a plurality of superposed layers of a material 18. These predetermined volume elements may have one geometry and be different volumes from each other, in so far as conventional implementation of such an additive manufacturing process allows this. The volume elements of the invention may also consist of the same material, or according to one advantageous variant may consist of at least two materials that differ in their refractive index, for example, or in their abradability.

Thus, at least two materials having different refractive indices will advantageously be used to give the target ophthalmic lens 30 optimized functional and optical properties. The advantage of using at least two materials having different abradabilities is particularly appreciable when determining the settings of the additive manufacturing step, as using two materials especially allows the deposition of the extra thickness Se of the most suitable material to be optimized depending on the predetermined sequence to be implemented in the subtractive manufacturing step.

This plurality of superposed layers forms the body, together with the first face 15 and the second face 16, of the intermediate optical element 10.

It will be noted that the superposed layers of the first material 18 here have different lengths so as to form the first and second faces 15 and 16 of the intermediate optical element 10.

It will be noted that the notion of "layers" is only nominally applicable to certain additive manufacturing technologies, a layer then merely being a set of voxels artificially deposited in a given pass of the nozzles or with a given mask. However, the teaching of the present invention is easily transferred to these technologies.

These layers here each have a substantially constant thickness over their length and they all have substantially the same thickness. It will be noted that certain additive manufacturing technologies may produce layers with thicknesses that vary throughout the layer. However, the teaching of the present invention is easily transferred to these technologies.

It will be noted that this equi-thickness is obtained here by virtue of controlled deposition, by the nozzle or the bank of nozzles 13 of the additive manufacturing machine 1, of a set number of predetermined volume elements in each superposed layer of the material 18.

Its will be noted that here the material 18 is an acrylic polymer, and more precisely a photopolymer, for example a photopolymer such as the product marketed by the company OBJET Ltd, under the trademark VeroClear™.

It will be noted that the additive manufacture of the intermediate optical element 10 may require, in addition to the deposition of the plurality of successive superposed layers, one or more photopolymerization steps. The photopolymerization steps may take place on deposition of each volume element or a blanket photopolymerization may be carried out after one pass of the nozzle and/or the bank of nozzles or after each layer of material has been deposited. Moreover, it will be noted, as will be seen below in more detail, that the intermediate optical element 10 may not be completely polymerized at the end of the additive manufacturing step of this intermediate optical element 10.

The body of the intermediate optical element 10 includes two extra thicknesses 8 arranged on either side of the body on the first and second faces 15 and 16, respectively.

The geometry of the intermediate optical element 10, in the embodiment illustrated here, is designed so as to obtain, on at least one face, an extra thickness Se, which covers all of this face 15, relative to the geometric envelope of the target ophthalmic lens 30. This extra thickness Se is defined in the invention as the distance between the surface of the geometric envelope of the target ophthalmic lens and an "interior" surface of the intermediate optical element, i.e. in particular a surface defined by those points of each layer of the surface of the intermediate optical element which are locally closest to the surface of the final ophthalmic lens.

Thus, locally, the extra thickness Se varies at least at the junctions between neighboring voxels, or at the "steps" between two superposed layers or sheets.

In addition, the extra thickness Se is not necessarily a constant value at every point relative to the geometric envelope of the target ophthalmic lens 30. In particular, at certain points on the intermediate optical element 10 the extra thickness may be comprised in the interval [30 μm, 50 μm] and at other points, the extra thickness may be comprised in the interval [100 μm, 500 μm] or even locally reach 1 to 2 mm.

However, preferably over the entirety of the intermediate optical element 10, the extra thickness Se is comprised in the interval [1 μm, 2000 μm]. Preferably, the average extra thickness over the entirety of the lens may be comprised in the interval [10 μm, 1000 μm], and preferably in the interval [30 μm, 500 μm]. Preferably, the extra thickness is comprised in the interval [10 μm, 1000 μm], and preferably in the interval [30 μm, 500 μm].

It will be noted that in the body of the intermediate optical element 10 two dotted lines and two continuous lines are shown that each follow substantially the cross-sectional shape of the first and second faces 15 and 16 of the intermediate optical element 10.

The continuous and dotted lines placed in proximity to a respective face are located at a distance from each other, which distance corresponds to the respective extra thickness 8 (Se).

It will be noted that the continuous lines define the so-called target geometry of the target ophthalmic lens 30 to be manufactured whereas the dotted lines define the geometry of the intermediate optical element 10 to be manufactured.

The geometry of the intermediate optical element 10 to be additively manufactured is determined depending on the predetermined sequence of the at least one material-removing step (i.e. the step referred to as the machining step) chosen from what is referred to as a roughing step, what is referred to as a finishing step and/or what is referred to as a polishing step.

In FIG. 2, the extra thicknesses 8 of the first and second faces 15 and 16, which are also referenced Se, are each equal to the sum of two set thicknesses, referenced $e_1$ and $e_2$ (see the detail view in FIG. 2), which respectively correspond to a thickness of material removed in one of the material-removing steps of the predetermined sequence.

In other words, the intermediate optical element 10, in this illustrative case, is manufactured so as to have a set geometry, with two set extra thicknesses 8, in order then to undergo two material-removing steps, a finishing first step implemented in the machine tool 21, with a first tool, and configured to remove the thickness $e_1$ from each of the first and second faces 15 and 16 of the element 10, and a polishing second step also implemented in the machine tool 21, with a second tool different from the first tool, and configured to remove the thickness $e_2$ from each of the first and second faces 15 and 16 of the element 10.

It will be noted that the extra thicknesses 8 are here comprised in an interval of values about equal to [50 μm; 600 μm], that the thickness $e_1$ (called the first set thickness) of material removed is here comprised in an interval of values about equal to [40 μm; 500 μm] and that the thickness $e_2$ (called the second set thickness) of material removed is here comprised in an interval of values about equal to [10 μm; 100 μm].

Implementing these two surfacing steps, namely the finishing first step and the polishing second step, on the intermediate optical element 10 allows the target ophthalmic lens 30, illustrated in cross section on the right in FIG. 2, to be obtained.

The target ophthalmic lens 30 thus manufactured includes a body having a front face 35 and a back face 36 opposite the front face 35, and an outline that here is identical to that of the intermediate optical element 10.

Specifically, the intermediate optical element 10 has here been manufactured directly with an outline matching a shape of a predetermined frame in which the target ophthalmic lens 30 is configured to be fitted.

The target ophthalmic lens 30 furthermore has the optical function, here complex, prescribed thereto.

Figure 3:
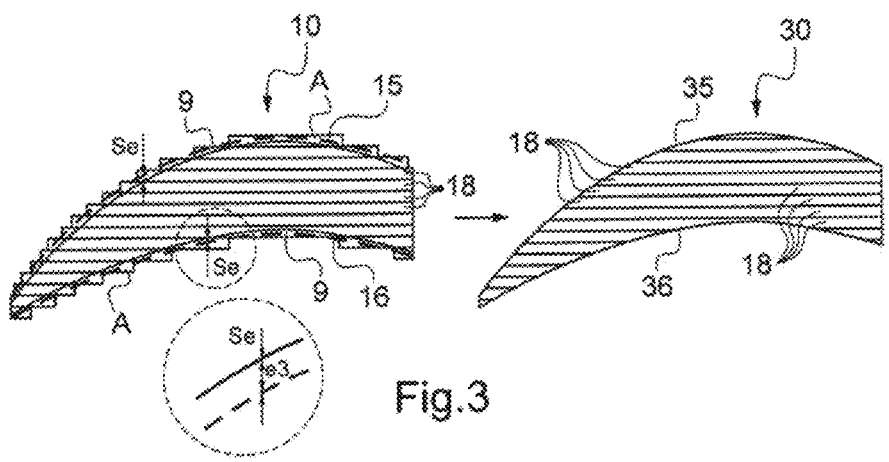

FIG. 3 schematically shows the various steps of a process for manufacturing the target ophthalmic lens 30, in a predetermined sequence, including at least one subtractive manufacturing step, different from that allowing the manufacture, as shown in FIG. 2, firstly of the intermediate optical element 10 then the target ophthalmic lens 30.

On the left in FIG. 3 is shown the additively manufactured intermediate optical element 10, whereas on the right of this figure is shown the target ophthalmic lens 30 subtractively manufactured from this intermediate optical element 10.

Here, the intermediate optical element 10 is similar to that illustrated on the left in FIG. 2, the difference being in the extra thicknesses 9 that it has on its first and second faces 15 and 16, which extra thicknesses 9 are defined for removal in a single polishing step.

The continuous line (representative of the so-called target geometry of the target ophthalmic lens 30 to be manufactured) and the dotted line (representative of the geometry of the intermediate optical element 10 to be manufactured) are therefore located at a distance from each other that corresponds to the respective extra thickness 9, also referenced Se. The extra thicknesses 9 are each equal to a set thickness, referenced $e_3$ (see the detail view in FIG. 3).

In other words, the intermediate optical element 10 is manufactured so as to have a set geometry, with two set extra thicknesses 9, in order then to undergo a single polishing step implemented in the machine tool 21, with a third tool, and configured to remove the thickness $e_3$ from each of the first and second faces 15 and 16 of the element 10.

It will be noted that the extra thicknesses 9 and the thickness $e_3$ (called the third set thickness) of material removed are here similar and comprised in an interval of values about equal to [10 μm; 150 μm]. These extra thicknesses $e_3$ are not necessarily identical on each of the two faces of the intermediate optical element (10).

In addition, it will be noted that this step requires the geometry of the intermediate optical element to allow the geometry desired for the target ophthalmic lens 30 to be obtained in a single polishing step.

Implementing this single subtractive manufacturing step on the intermediate optical element 10 allows the target ophthalmic lens 30 illustrated, in cross section, on the right in FIG. 3 to be obtained, this lens having the optical function, here complex, prescribed thereto.

A process for manufacturing this target ophthalmic lens 30 will now be described in more detail with reference to FIGS. 4 to 6.

The manufacturing process comprises the step 100 of additively manufacturing the intermediate optical element 10 with the additive manufacturing machine 1, according to a set geometry.

The process optionally comprises the step 200 of irradiating the intermediate optical element 10 obtained. This step 200 completes the polymerization of the intermediate optical element 10.

The process furthermore comprises the step 300 of subtractively manufacturing in a predetermined sequence of at least one surfacing step the ophthalmic lens 30 from the intermediate optical element 10, with the machine tool 21.

The process optionally comprises the step 400 of treating the front face and/or back face of the ophthalmic lens thus obtained by additive then subtractive manufacturing, in order to add thereto one or more predetermined coatings, for example an antifog and/or antireflection coating and/or a tinted coating and/or a photochromic and/or anti-scratch coating, etc.

Figure 4:
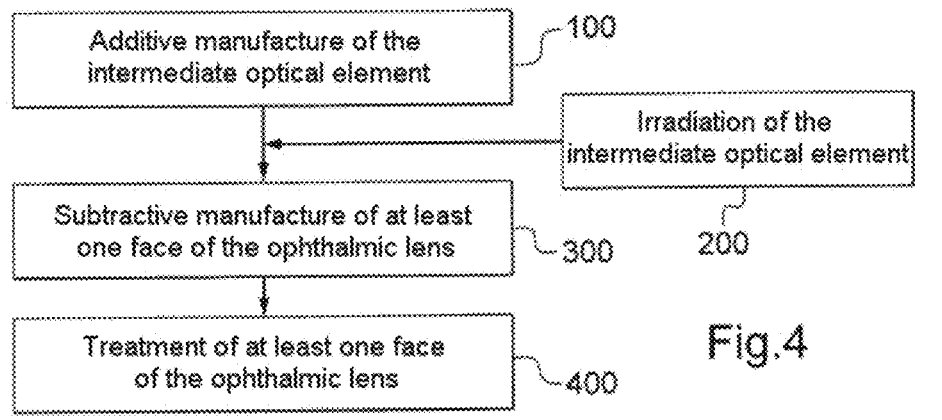
FIG. 4 is a flowchart illustrating various operating steps of a process for manufacturing an ophthalmic lens, including the steps illustrated in FIGS. 2 and 3, namely a step of additively manufacturing an intermediate optical element and a step of subtractively manufacturing by surfacing an ophthalmic lens from the intermediate optical element.

FIG. 5 illustrates steps of the manufacturing process and more precisely steps for determining manufacturing settings of the intermediate optical element 10 with a view to its additive manufacture by virtue of the additive manufacturing machine 1 illustrated in FIG. 1; and therefore with a view to providing this intermediate optical element 10 for one of steps 200 and 300 of the process illustrated in FIG. 4.

The command/control unit 2 (called the first unit) of the additive manufacturing machine 1 is configured to receive in step 101 a file containing prescription values of a wearer of the ophthalmic lens 30 to be manufactured.

These prescription values of the wearer are generally expressed in diopters (D).

The first unit 2 is furthermore configured to receive, in the step 102, complementary fitting and personalization data relating to the wearer, to a frame intended to receive the ophthalmic lens 30 and to the prescription.

It will be noted that these complementary fitting and personalization data for example correspond to geometric values that especially characterize the frame and the visual behavior of the wearer. It may for example be a question of an eye-lens distance and/or a position of the eye rotation center, and/or of an eye-head coefficient, and/or of a pantoscopic angle and/or of a face-form angle of the frame and/or of the outline of the frame.

The first unit 2 is configured to determine in the step 103 a corrective optical function tailored to the wearer from the wearer prescription values and complementary fitting and personalization data received in the respective steps 101 and 102, and depending on the geometric position of the lens 30 relative to the eye of the wearer.

This corrective optical function tailored to the wearer corresponds to the target optical function of the ophthalmic lens 30 to be manufactured.

It will be noted that the corrective optical function tailored to the wearer may be determined for example using a ray tracing software package, which allows the wearer power and the resulting astigmatism of the lens to be determined for the wear position of the latter. An optimization may be carried out using well-known optical optimization methods.

It will also be noted that the step 102 is optional and therefore that the corrective optical function tailored to the wearer may be determined by the first unit 2 in the step 103, only from prescription values received in step 101, and depending on the geometric position of the ophthalmic lens 30 relative to the eye of the wearer.

The first unit 2 is configured to generate in the step 104 a file named "optical function" that characterizes this corrective optical function tailored to the wearer, as determined in the step 103.

It will be noted that this "optical function" file is what is called a surface file that for example contains geometric characteristics taking the form of x, y, z, θ coordinates of a finite number of points, or the form of a surface function z=f(x,y) defining each face, characteristics associated with a refractive index, and various distances and angles such as those mentioned above.

It will be noted that the corrective optical function tailored to the wearer may, instead of being determined by the first unit 2 in the step 103, be received directly by this first unit 2 in the form of such a file.

The first unit 2 is configured to determine, in the step 105, target geometric characteristics for the ophthalmic lens 30 to be manufactured, from the "optical function" file generated in the step 104 and from complementary fitting and personalization data received in the step 102, and in particular the data related to the frame provided to receive the ophthalmic lens 30.

The first unit 2 is configured to generate in the step 106 a file named "target geometry" that characterizes the geometric characteristics of the ophthalmic lens 30 to be manufactured, as determined in the step 105.

It will be noted that this "target geometry" file is also what is called a surface file that for example contains geometric characteristics taking the form of x, y, z, θ coordinates of a finite number of points, or the form of a surface function z=f(x,y) defining each face, these characteristics being associated with a refractive index and with various distances and angles such as those mentioned above. The "target geometry" file is in fact representative both of the optical function and of the geometry to be given to the ophthalmic lens 30.

The first unit 2 is furthermore configured to receive in the step 107, a file containing data relating to the surfacing carried out with the subtractive manufacturing machine 21. These data relate, on the one hand, to the choice of the predetermined sequence of the at least one subtractive manufacturing step, and on the other hand, to parameters intrinsic to the machine and to the cutting tool. It may also for example be a question, for the machine, of the aforementioned smoothing and/or polishing parameters, such as the rotation speed, reciprocating speed, number of passes and reciprocating amplitude of the reciprocating tool, and, for the tool, the pupil diameter.

It will be noted that the first unit 2 is furthermore configured to receive (step not shown) a file containing characteristics related to the refractive index of the material 18 used to additively manufacture the intermediate optical element 10.

It will also be noted that the first unit 2 is configured to determine, optionally, a dimensional shrinkage and an index variation of the intermediate optical element 10. It is here a question of possible subsequent changes, on the one hand, to the refractive index of the material 18 in which the intermediate optical element 10 is manufactured, and on the other hand, to the geometry (dimensional shrinkage) of this intermediate optical element 10.

It will also be noted that the first unit 2 is configured to determine, optionally, a modification to the overall curvature that could be caused, for example in the polishing step, by plastic deformation or by compression of the lens during polishing under the influence of the polishing tool.

The first unit 2 is configured to determine in the step 108 the one or more extra thicknesses 8, 9 (Se) to be given to the intermediate optical element 10 from characteristics and values generated or received in the files at least in the steps 106 and 107 and relating respectively: to the target geometry of the ophthalmic lens 30 to be manufactured; and to the received data relating to the surfacing, this data depending on the chosen sequence of at least one step from a machining step and polishing step; and, from the value of the refractive index of the manufacturing material of the intermediate optical element 10; and characteristics relating to possible dimensional shrinkage and to possible variation in the refractive index of the intermediate optical element 10.

The first unit 2 is configured, in the step 109, to deduce geometric characteristics of the intermediate optical element 10 to be manufactured, from the one or more values of the extra thicknesses 8, 9, determined in step 109, in combination with the "target geometry" file generated in step 106.

It will be noted that these geometric characteristics of the intermediate optical element 10 are thus deduced in such a way that the one or more extra thicknesses are representative of the difference in geometry between the target geometry of the ophthalmic lens 30 and the geometry of the intermediate optical element 10.

The first unit 2 is furthermore configured to generate a file, in the step 110, that characterizes the geometric features of the intermediate optical element 10 as deduced in step 109, these features being representative of the desired geometry, the latter taking into consideration the predetermined sequence of at least one subtractive manufacturing step.

It will be noted that this file is also what is called a surface file that for example contains geometric characteristics taking the form of x, y, z, θ coordinates, or the form of a surface function z=f(x,y) defining each face, of a finite number of points, characteristics associated with a refractive index, and various distances and angles such as those mentioned above.

In other words, this "surface" file reflects a description of the geometry desired for the intermediate optical element 10 to be manufactured, with, in practice, a set arrangement of the predetermined volume elements of the one or more materials.

It will be noted that the geometry of the intermediate optical element 10 is defined so as to directly match the outline of the frame in which the lens 30 is configured to be fitted. As a variant, the outline of the element 10, as defined in this file, does not correspond to the outline of the frame and an edging operation is required.

The first unit 2 is furthermore configured to determine in the step 113 the manufacturing settings of the intermediate optical element 10, from characteristics contained in the file generated in step 110 relating to the geometry of the intermediate optical element 10.

The first unit 2 is configured to generate in the step 114 the manufacturing file corresponding to the manufacturing settings of the intermediate optical element 10 on the manufacturing holder 12 of the additive manufacturing machine 1 (in a known coordinate system of this machine).

This "settings" file is similar to the geometry file of the intermediate optical element 10 generated in step 110, the difference being that it reflects a transcribed description of the geometry desired for the intermediate optical element 10 to be manufactured, with, in practice, an arrangement of the predetermined volume elements of the one or more materials including a set angular orientation of the intermediate optical element 10 on the manufacturing holder 12 for its manufacture, and modifications related to possible dimensional shrinkage and possible variation in the index of the intermediate optical element 10.

It will be noted that, optionally, the first unit 2 is configured to check, in the step 111, whether it is feasible to manufacture the ophthalmic lens 30 in the surfacing machine tool 21, on the basis of the characteristics, contained in the file generated in step 110, relating to the geometry of the intermediate optical element 10, and on the basis of data relating to the surfacing machine tool 21, these data being received in step 107 and in particular relating to the diameter of the pupil of the smoothing and/or polishing tool of this machine 21.

Figure 7:
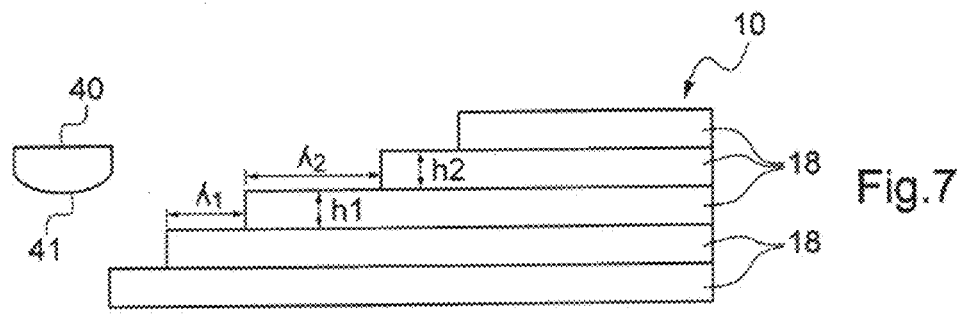
FIG. 7 schematically shows a step of manufacturing an ophthalmic lens using the system illustrated in FIG. 1.

FIG. 7 illustrates a detail of the intermediate optical element 10 shown in FIG. 2 on the first-face side (the first face is not shown) and a smoothing and/or polishing tool 40 the pupil 41 of which has an attacking face of predetermined diameter, for example 1 mm or 2 mm.

In this detail, five superposed layers of material 18 are partially shown, the first-face-side ends of which may be seen. Between two immediately superposed layers the thickness (or height) h ($h_1$, $h_2$) of which is predetermined, a step having a length λ ($\lambda_1$, $\lambda_2$) is formed. Here, the height and length of two steps are shown: $h_1$ and $\lambda_1$ and $h_2$ and $\lambda_2$, respectively.

In a first case, where the pupil diameter 41 is larger than or equal to the step length λ and the step height h is located in a predetermined interval of values, for example about equal to [1 μm; 50 μm], then the pupil 41 of the tool 40 is capable of removing the material (finish and/or polish) from the surface of the intermediate optical element 10 in such a way as to remove the steps and to provide a roughness of optical quality while also ensuring the geometry and optical function desired for the ophthalmic lens 30 are obtained.

In a second case, where the pupil diameter 41 is smaller than the step length λ and/or the step height h is not located in a predetermined interval of values, for example equal to about [1 μm; 50 μm], then the pupil 41 of the tool 40 may for example leave certain traces of the steps and/or not be able to ensure that the geometry and optical function desired for the ophthalmic lens 30 are obtained.

The first unit 2 is configured to make these checks and decide, in the first case, to continue the process with the step 113 of determining the manufacturing settings of the intermediate optical element 10 and, in the second case, to make a correction to the geometry of the intermediate optical element 10.

The first unit 2 is thus configured, either to make directly a correction to the one or more extra thicknesses in the step 108, or to determine in the step 112 a correction to the angular orientation of the intermediate optical element 10 on and relative to the manufacturing holder 12 of the additive manufacturing machine 1, the step 112 possibly being followed by a correction to the one or more extra thicknesses in the step 108.

It will be noted that the correction to the angular orientation of the intermediate optical element 10 for its manufacture especially makes it possible to influence the length λ of the steps whereas the correction to the one or more extra thicknesses is representative of a purposeful addition of a plurality of predetermined volume elements of material 18, especially to steps the length A of which is larger than the diameter of the pupil 41, in order to decrease their length, or even of a purposeful addition of a plurality of predetermined volume elements of material 18 especially to at least partially fill in certain steps, and thus decrease their height.

The first unit 2 may also be configured to initiate, in the step 115, the additive manufacture of the intermediate optical element 10 on the manufacturing holder 12 in the additive manufacturing machine 1, based on the characteristics in the manufacturing file generated in the step 114.

This first command/control unit 2 is therefore configured to run a software package designed to implement various steps of the process for manufacturing the ophthalmic lens, this software package using the received parameters to determine the manufacturing settings of the intermediate optical element 10, or even to produce the intermediate optical element 10.

Figure 6:
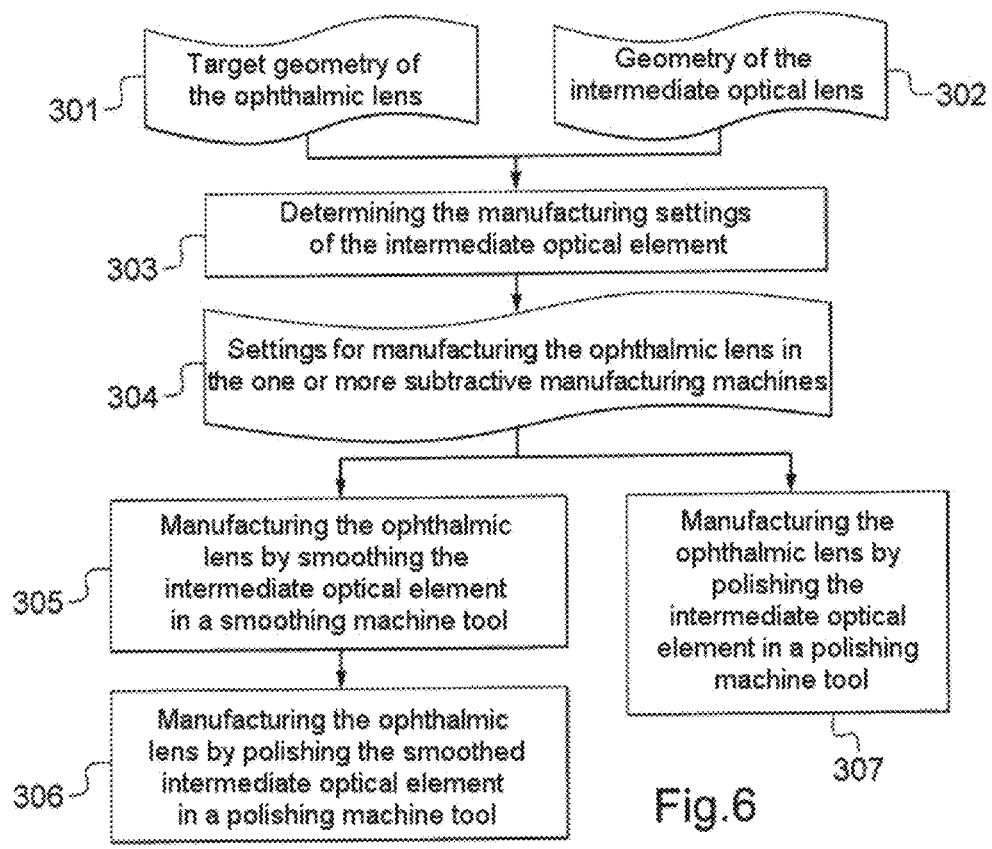

FIG. 6 illustrates steps of the manufacturing process and more precisely steps for determining a manufacturing settings of the ophthalmic lens 30 with a view to its subtractive manufacture, by virtue of the subtractive manufacturing machine 21 illustrated in FIG. 1, from the intermediate optical element 10 obtained by additive manufacturing.

The command/control unit 22 (called the second unit) of the subtractive manufacturing machine 21 is configured to receive in the step 301 the "target geometry" file generated in the step 106 and representative of the geometry of the ophthalmic lens.

The second unit 22 is furthermore configured to receive, in the step 302, the file characterizing the geometry of the additively manufactured intermediate optical element 10 and generated in the step 110.

The second unit 22 is furthermore configured to determine in the step 303 the manufacturing settings of the ophthalmic lens 30, from geometric characteristics contained in the files generated in the steps 106 and 110 and received in the steps 301 and 302, respectively.

The second unit 22 is configured to generate in the step 304 the manufacturing file corresponding to the settings for manufacturing the ophthalmic lens 30 from the intermediate optical element 10 on the manufacturing holder 32 of the machine tool 21 (in a known coordinate system of this machine).

This "settings" file is representative of the turning (or surfacing) that needs to be carried out on the additively manufactured intermediate optical element 10 to obtain an ophthalmic lens 30 having the geometry set beforehand.

The second unit 22 may also be configured to initiate, in the step 305 and based on the characteristics in the manufacturing file generated in the step 304, smoothing, with a first predetermined tool, of at least one face 15, 16 of the intermediate optical element 10 obtained on the manufacturing holder 32 in the machine tool, in order to remove the first set thickness $e_1$ of material.

The second unit 22 may furthermore be configured to initiate, in the step 306 and based on the characteristics in the manufacturing file generated in the step 304, polishing, with a second predetermined tool, of at least one face 15, 16 of the intermediate optical element 10 smoothed in step 305, on the manufacturing holder 32 in the machine tool, in order to remove the second set thickness $e_2$ of material.

The steps 305 and 306 therefore correspond to a first predetermined sequence of two surfacing steps.

The second unit 22 may as a variant be configured to initiate, in the step 307 (replacing the steps 305 and 306) and based on the characteristics in the manufacturing file generated in the step 304, a single polish, with a third predetermined tool, of at least one face 15, 16 of the intermediate optical element 10 obtained on the manufacturing holder 32 in the machine tool, in order to remove the third set thickness $e_3$ of material.

The step 307 therefore corresponds to a second predetermined sequence of a single polishing step.

This second command/control unit 22 is therefore configured to run a software package designed to implement various steps of the process for manufacturing the ophthalmic lens 30, this software package using the received parameters to determine the manufacturing settings of the ophthalmic lens 30, or even to produce said lens 30 from the intermediate optical element 10 via a predetermined sequence.

In one variant (not illustrated) a client-server communication interface has what is referred to as a provider side and what is referred to as a client side, these two sides communicating over a network, for example the Internet.

The provider side comprises a server connected to command/control units of the same type as those in FIG. 1, but this time not integrated into a manufacturing system, and in particular not integrated into additive manufacturing and surfacing machines, this server being configured to communicate with the Internet interface.

The client side is configured to communicate with the Internet interface, and is connected to one or more command/control units of the same type as those on the provider side.

Furthermore, the one or more client-side units are connected to an additive manufacturing machine, of the same type as that in FIG. 1, for manufacturing the intermediate optical element, and to at least one surfacing machine for manufacturing the ophthalmic lens from the intermediate optical element.

The one or more client-side units are configured to receive the data files corresponding to steps 101, 102 and 107, and the data characterizing the material used.

The one or more client-side units transmit via the Internet interface and the server these data to the one or more provider-side units in order to determine the manufacturing settings of the intermediate optical element and to determine the manufacturing settings of the ophthalmic lens.

The one or more provider-side units run, via their data processing systems, the computer program that they contain, to implement the manufacturing process, and thus deduce, on the one hand, the manufacturing settings for the manufacture of the intermediate optical element, and on the other hand, the manufacturing settings for the manufacture of the ophthalmic lens.

The one or more provider-side units transmit, via the server and the network, a determined file representative of the manufacturing settings of the intermediate optical element and a determined file representative of the manufacturing settings of the ophthalmic lens to the one or more client-side command/control units.

The one or more client-side units are configured to run a software package for implementing the manufacturing process of the ophthalmic lens, using the received parameters, in order to produce the intermediate optical element and then the ophthalmic lens.

As variants (not illustrated):
the manufacturing system includes only one and the same machine into which additive manufacturing and surfacing devices are integrated;
the superposed and juxtaposed plurality of predetermined volume elements forms superposed layers that each have a thickness that is constant or that varies over their length and/or that all do or do not have the same thickness;
the material is for example a transparent material deposited by stereolithography, this material being for example an epoxy polymer marketed by the company 3D SYSTEMS under the trademark Accura® ClearVue;
the material is a photopolymer comprising one or more families of molecules having one or more acrylic, methacrylic, acrylate or methacrylate functions; a family of molecules having one or more epoxy, thioepoxy or thiolene functions; a family of molecules having one or more vinyl ether, vinyl caprolactam or vinylpyrolidone functions; a family of hyperbranched or hybrid organic/inorganic materials; or a combination of these functions; the mentioned chemical functions possibly being carried by monomers or oligomers or a combination of monomers and oligomers;
the material may comprise at least one photoinitiator;
the material may comprise colloids, in particular colloidal particles of smaller size for example than visible wavelengths, such as for example colloidal particles of silicon oxide SiO2 or colloidal particles of zirconium oxide ZrO2;
the material may comprise, in at least certain of the predetermined volume elements, a pigment or dye, for example a dye belonging to the azo or rhodamine or cyanine or polymethine or merocyanine or fluorescein or pyrylium or phthalocyanine or perylene or benzanthrone or anthrapyrimidine or anthrapyridone families, or even a metal-complex dye such as a rare-earth cryptate or chelate;
the intermediate optical element is produced from other materials, such as polycarbonate, polymethyl methacrylate, polyamide or from the following polymers: thiourethane polymers or episulfide polymers; these materials being well known to those skilled in the art in the field of ophthalmic lenses;
the process furthermore comprises one or more other manufacturing steps, for example a edging step and/or a marking step used to form what are referred to as temporary markings;
the additive manufacturing holder has a manufacturing surface on which the intermediate optical element is additively manufactured, which manufacturing surface is at least partially planar and/or at least partially spherical;
the manufacturing process comprises an additional thermal irradiation step and/or an additional actinic irradiation step, such as for example at wavelengths in the ultraviolet spectrum, or even no irradiation step;
the manufacturing process comprises a step in which variation in the refractive index of the intermediate optical element material may be taken into account by way of an iterative optimization loop according to known optimization procedures;
the material of the intermediate optical element optionally comprises one or more dyes, and/or nanoparticles configured to modify its optical transmission and/or its appearance, and/or nanoparticles or additives configured to modify its mechanical properties;
the additive manufacturing machine is not a three-dimensional printing machine but rather a stereolithography machine (or SLA for stereolithography apparatus) or a thermoplastic filament extrusion machine, also called a tensioned filament deposition machine (or FDM machine, FDM standing for fused deposition modeling);
at least one command/control unit comprises a microcontroller instead of a microprocessor;
the client-server communication interface comprises devices configured to transfer the manufacturing settings of the intermediate optical element and the manufacturing settings of the ophthalmic lens, these settings being determined by a computer program, which contains instructions configured to implement each of the steps of the manufacturing process described above when this computer program is run in at least one command/control unit that comprises system elements configured to run said computer program;

the communication interface enables communication via means other than the Internet, for example via an intranet or a secure private network; and/or the communication interface makes it possible to transfer the entire computer program to a remote data processing system so as to implement the manufacturing process in another manufacturing system provided with an additive manufacturing machine and at least one surfacing machine, and optionally in one or more other processing/treatment machines.

It is recalled more generally that the invention is not limited to the examples described and shown.

The invention claimed is:

1. A process for manufacturing an ophthalmic lens having at least one optical function, comprising the following steps:
    additively manufacturing an intermediate optical element by depositing a plurality of predetermined volume elements of at least one material having a predetermined refractive index, said intermediate optical element comprising a target ophthalmic lens adjoined to an extra thickness consisting of a portion of said plurality of volume elements; and
    subtractively manufacturing by machining said target ophthalmic lens from said intermediate optical element, the machining being carried out in a predetermined sequence, of at least one step, said predetermined sequence allowing said extra thickness to be subtracted,
    said additive manufacturing step comprising a step of determining manufacturing settings for said intermediate optical element in which said extra thickness is determined depending on said predetermined sequence defined in the subtractive manufacturing step.

2. The process as claimed in claim 1, wherein the extra thickness generated in the additive manufacturing step leading to the intermediate optical element and then subtracted in the subtractive manufacturing step leading to the target ophthalmic lens has a dimension between 1 µm and 1000 µm inclusive.

3. The process as claimed in claim 1, wherein said predetermined sequence comprises at least one step chosen from one or more of a roughing step, a finishing step, and a polishing step.

4. The process as claimed in claim 3, wherein said predetermined sequence is chosen from one of:
    a roughing step carried out on the intermediate optical element leading to a roughed intermediate optical element, followed by a finishing step carried out on said roughed intermediate optical element leading to a first finished intermediate optical element, followed by a polishing step carried out on said first finished intermediate optical element leading to the target ophthalmic lens, a finishing step carried out on the intermediate optical element leading to a second finished intermediate optical element, followed by a polishing step carried out on said second finished intermediate optical element leading to the target ophthalmic lens, and
    a polishing step carried out on the intermediate optical element leading to the target ophthalmic lens.

5. The process as claimed in claim 3, wherein said predetermined sequence is identical or different on the entire intermediate optical element.

6. The process as claimed in claim 1, wherein the additively manufacturing step is carried out by depositing a plurality of predetermined volume elements of a given constituent material of the target ophthalmic lens and extra thickness.

7. The process as claimed in claim 1, wherein the additively manufacturing step is carried out by depositing a plurality of predetermined volume elements of at least two different materials, the materials especially differing in their refractive index or in their intrinsic abradability.

8. The process as claimed in claim 1, wherein the additive manufacturing step implements one of a three-dimensional printing, stereolithography, a mask projection stereolithography process, a selective laser melting or sintering process, and a thermoplastic filament extrusion process.

9. The process as claimed in claim 1, wherein said step of determining a manufacturing setting for said intermediate optical element includes the following steps:
    determining target geometric characteristics for said ophthalmic lens from characteristics of said optical function to be given to said ophthalmic lens,
    determining said extra thickness, from said determined target geometric characteristics and characteristics associated with said predetermined subtractive manufacturing sequence, and
    deducing the geometric characteristics of said intermediate optical element from said determined target geometric characteristics and from said determined extra thickness.

10. The process as claimed in claim 9, wherein the step of determining said extra thickness includes taking into account material physical data associated with said predetermined subtractive manufacturing sequence.

11. The process as claimed in claim 9, wherein said optical function to be given to said ophthalmic lens is characteristic of prescription values associated with a wearer of said ophthalmic lens and complementary fitting data of a predetermined frame, personalization data, and/or frame-shape data.

12. The process as claimed in claim 1, wherein the intermediate optical element has an outline substantially equal to an outline configured to be inserted into a predetermined frame.

13. A system for manufacturing an ophthalmic lens, the system comprising:
    an additive manufacturing machine and at least one subtractive manufacturing machine, in order to manufacture an ophthalmic lens; and
    at least one command/control unit provided with system elements configured to run a computer program comprising instructions configured to implement each of the steps of the process as claimed in claim 1.

14. The manufacturing system as claimed in claim 13, further comprising a varnishing machine configured to deposit a varnish on the element output by the subtractive manufacturing machine.

15. The manufacturing system as claimed in claim 13, wherein the additive manufacturing machine comprises a manufacturing holder that is removable and configured to serve as a manufacturing holder for the subtractive manufacturing machine.

16. The process as claimed in claim 2, wherein said predetermined sequence comprises at least one step chosen from one or more of a roughing step, a finishing step, and a polishing step.

17. The process as claimed in claim 16, wherein said predetermined sequence is chosen from one of:

a roughing step carried out on the intermediate optical element leading to a roughed intermediate optical element, followed by a finishing step carried out on said roughed intermediate optical element leading to a first finished intermediate optical element, followed by a polishing step carried out on said first finished intermediate optical element leading to the target ophthalmic lens, a finishing step carried out on the intermediate optical element leading to a second finished intermediate optical element, followed by a polishing step carried out on said second finished intermediate optical element leading to the target ophthalmic lens, and a polishing step carried out on the intermediate optical element leading to the target ophthalmic lens.

18. The process as claimed in claim 4, wherein said predetermined sequence is identical or different on the entire intermediate optical element.

19. The process as claimed in claim 17, wherein said predetermined sequence is identical or different on the entire intermediate optical element.

20. The process as claimed in claim 2, wherein the extra thickness has a dimension between 30 µm and 1000 µm inclusive.

\* \* \* \* \*